SP
000,100

United States Statutory Invention Registration [19]

[11] Reg. Number: H100

[45] Published: Aug. 5, 1986

Denton

[54] APPARATUS FOR NEBULIZING PARTICULATE LADEN SAMPLES OF LUBRICATING OILS

[75] Inventor: Medona B. Denton, Tucson, Ariz.

[73] Assignee: The United States of America as represented by the Secretary of the Navy, Washington, D.C.

[21] Appl. No.: 655,135

[22] Filed: Sep. 27, 1984

Related U.S. Application Data

[63] Continuation-in-part of Ser. No. 445,401, Nov. 30, 1982, abandoned.

[51] Int. Cl.[4] ..... B05B 1/24

[52] U.S. Cl. ..... 239/133; 239/135; 239/434; 261/78 A

[58] Field of Search ..... 239/132, 133, 135–138, 239/418, 423, 426, 433, 434; 261/78 A

[56] References Cited

U.S. PATENT DOCUMENTS

| | | | |
|---|---|---|---|
| 535,000 | 3/1895 | Goodman | 239/426 X |
| 909,190 | 1/1909 | Keller | 239/418 X |
| 1,688,509 | 10/1928 | Smith | 239/137 X |
| 2,066,703 | 1/1937 | Stephens | 239/137 X |
| 2,235,664 | 3/1941 | Bachmann | 239/136 X |
| 2,683,057 | 7/1954 | Nusbaum | 239/135 |
| 2,840,148 | 6/1958 | Akesson | 239/133 X |
| 2,944,743 | 7/1960 | Kachergis | 239/451 X |
| 3,191,718 | 6/1965 | Haywood | 239/135 X |
| 3,655,135 | 4/1972 | Altman et al. | 239/136 X |
| 4,206,160 | 6/1980 | Suddendorf et al. | 239/434 X |

FOREIGN PATENT DOCUMENTS

| | | | |
|---|---|---|---|
| 255564 | 6/1948 | Switzerland | 239/135 |

*Primary Examiner*—Harold I. Tudor
*Attorney, Agent, or Firm*—Robert E. Beers; Thomas M. Phillips

[57] ABSTRACT

Apparatus for nebulizing particulate laden undiluted oil samples of varying viscosities suitable for subsequent analysis utilizing atomic spectroscopic principles. Undiluted samples of varying viscosity are heated as they are fed through an inlet tube where the heated oil is fed into a channel groove and brought into contact with a nebulizing gas introduced through an orifice intersecting the channeled groove in which the oil flows.

4 Claims, 7 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS FOR NEBULIZING PARTICULATE LADEN SAMPLES OF LUBRICATING OILS

BACKGROUND OF THE INVENTION

This is a continuation-in-part of application Ser. No. 445,401, filed Nov. 30, 1982, now abandoned.

The present invention relates to an analysis of lubricating oils for impurities and more particularly to improved apparatus for nebulizing the lubricating oils to be analyzed.

The analysis of used lubricating oils for metallic impurities is important in the implementation of sound maintenance programs for oil-lubricated equipment. Such analyses have been used in maintaining a variety of equipment and the U.S. Air Force realizes considerable savings each year by means of such an analysis program.

The method used for wear metal analysis should be simple, rapid and capable of determining several elements simultaneously. Current known methods of analysis requires special preparation of the oil samples which often include the dilution in a low viscosity solvent prior to analysis. This dilution is normally required to achieve nebulization of viscous samples, and to make the nebulization efficiency equal for samples of varying viscosity. While achieving these aims, the dilution also reduces the overall sensitivity of the anaylsis, degrades the limit of detection, and adds an opportunity for contamination or analysis error.

SUMMARY OF THE INVENTION

The present invention provides an apparatus for nebulizing samples of used lubricating oil without the need for dilution or other sample pretreatment. Undiluted samples of varying viscosity are heated as they are fed through an inlet tube into a chamber where the heated oil is brought in contact with a nebulizing gas introduced through a uniquely configured orifice tip. Aerosols thus generated are for subsequent analysis utilizing atomic spectroscopic principles.

Accordingly, an object of the invention is the provision of an oil nebulizer capable of nebulizing particulate laden samples of used lubricating oils.

Another object of the invention is the provision of an oil nebulizer for nebulizing particulate laden samples of used lubricating oils of varying viscosity to provide uniform aerosols which are suitable for introduction into an inductively coupled plasma atomic emission spectrophotometer.

Other objects, advantages and novel features of the invention will be come apparent from the following detailed description of the invention when considered in conjunction with the accompanying drawings.

Figure 1:
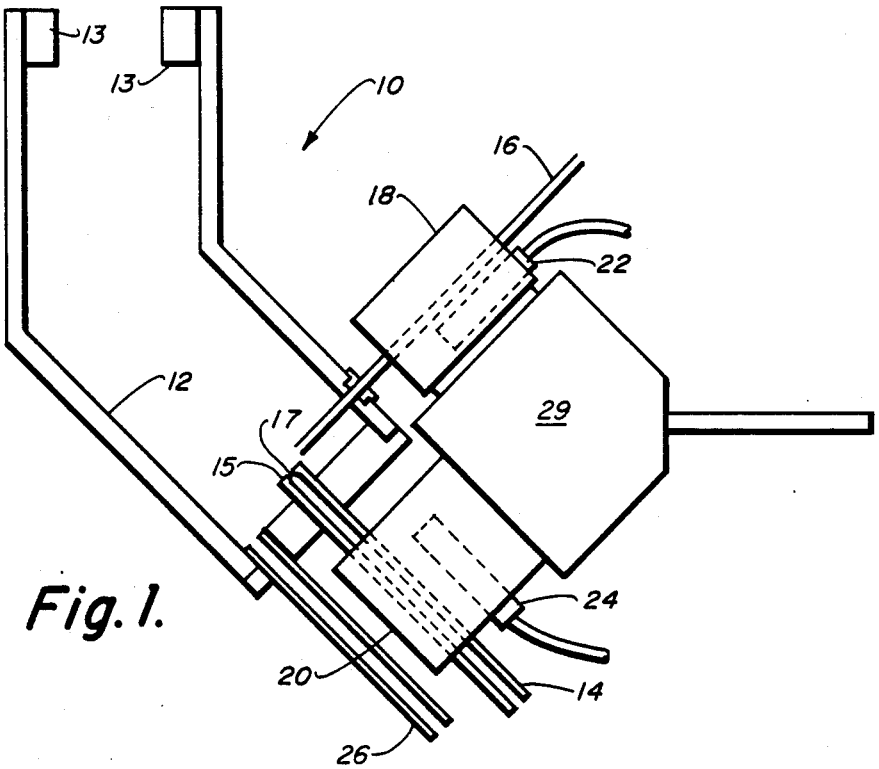
FIG. 1 shows the preferred embodiment of the invention.

Referring now to the drawings wherein there is shown in FIG. 1 nebulizer 10 having body chamber 12 which may be manufactured from Plexiglass tubing with a Teflon end cap 13. An orifice tube 14 having an orifice tip 15 is inserted in the base of chamber 12 for introducing gas under pressure. The oil sample to be nebulized is introduced through tube 16 mounted at right angles to orifice tip 15. Both the orifice tip 15 and oil sample delivery tube 16 are mounted in a good heat conducting material such as brass blocks 18 and 20, each containing heating means such as resistance heaters 22 and 24, respectively. Heaters 22 and 24 may be driven by variable autotransformers, not shown, and monitored by thermocouples, not shown, to control the oil and gas temperatures.

Chamber 12 is bent at a 45° angle so that the aerosol is easily directed upward into an inductively coupled plasma torch (ICP), not shown, which may be of the type described in U.S. Pat. No. 4,266,113. A drain tube 26 is provided to remove the larger drops of the oil sample.

The nebulizer assembly is mounted on a support bracket 29.

Figure 2:
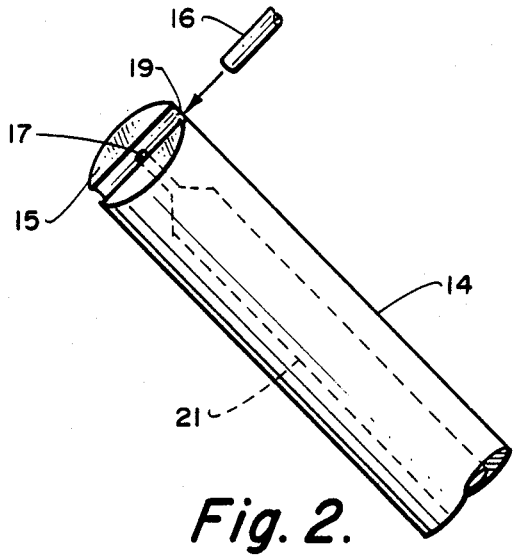
FIG. 2 shows the orifice tip used in the embodiment of FIG. 1.

As shown in FIG. 1, the orifice tube 14 is mounted at a 45° angle. When mounted in this manner, the orifice tip as shown in FIG. 2 is used. As shown in FIG. 2, a rod of approximately ¼ inch has a groove 19 milled at the orifice end. The channel 21 and orifice 17 are drilled to allow the appropriate gas flow. Oil from inlet tube 16 flows down groove 19 and passes in front of orifice 17.

Figure 6:
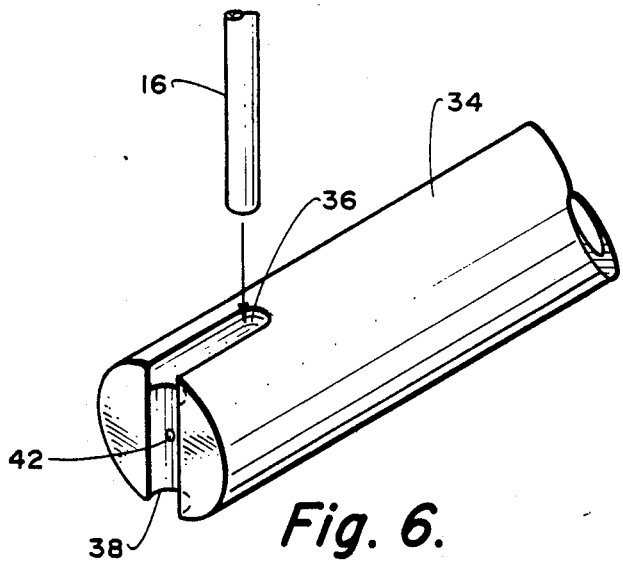
FIGS. 6 and 7 show the details of an alternate form of the orifice tip used in FIG. 1.
Figure 7:
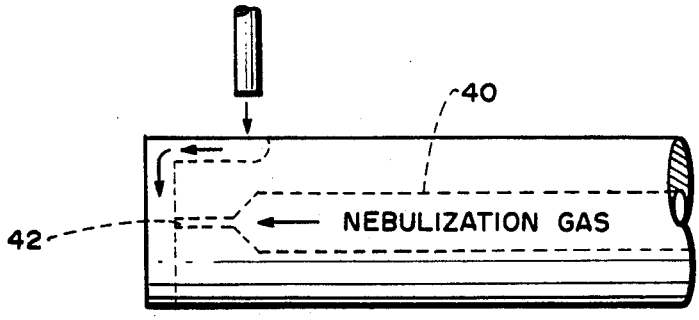

For operation, where the orifice tube is mounted horizonally, the configuration of FIGS. 6 and 7 is used. A horizontal groove 36 and a vertical groove 38 are milled at the orifice end of the orifice tube 34 formed by drilling a channel 40 and orifice 42. Oil from inlet tube 16 flows in groove 36 and down groove 38 in front of orifice 42.

In operation and by way of example, tip 15 has a 0.20 mm diameter orifice, producing a sample gas flow of one L/min when operated at 30 psi. The system used to evaluate the nebulizer is an inductively coupled plasma atomic emission spectrophotometer which is well known in the art. The ICP-AES system comprised a three tube concentric torch with an extended coolant tube, driven through a matching network by a linear amplifier excited at 27.12 MHz, a 0.35 monochromator, and a microcomputer for system control and data acquisition.

Oil samples may be delivered to nebulizer 10 by an suitable constant delivery pumping means. A stepper motor driven syringe pump employing disposable (1 to 10 ml) syringes was found satisfactory. The syringe pump can deliver samples at rates from 1 to 80 ml/min without regard for sample viscosity.

For use with flame atomic absorption spectrometry, the nebulizer must be capable of operation with a nebulization gas flow rate below 15 liters per minute. For use with an inductively coupled plasma atomic emission spectrophotometer, nebulization gas flow rate below two liters per minute are necessary. This low rate of flow of nebulization gas (typically argon) provides for the generation of a usable amount of aerosol.

The iron emission intensity was measured, using the above described system, as a function of sample temperature for a range of weights (viscosities) of Pennzoil brand motor oil, and for several brands of SAE 30W oil.

Figure 3:
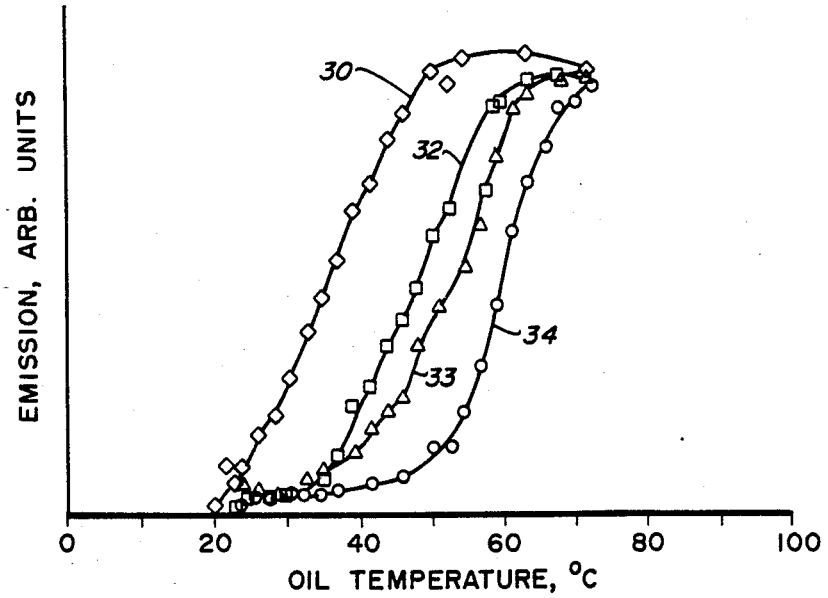
FIG. 3 is a graph showing emission intensity as a function of temperature for several viscosities of motor oils.
Figure 4:
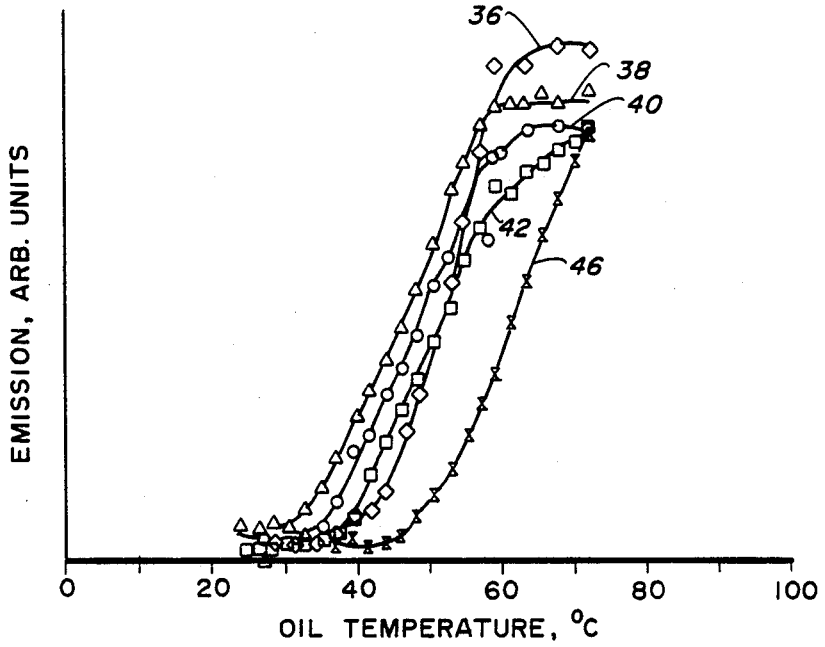
FIG. 4 is a graph showing emission intensity as a function of temperature for several different brands of motor oils having the same viscosity.

As seen in FIG. 3, the temperature profile curves have an "S" shape, and a relatively low slope at sample temperature at 70° C. The emission signal is increased by a factor of 10 to 50 when the temperature is raised from 25° C. to 70° C. Curve 30 is 20W; curve 32 is 30W; curve 33 is 40W and curve 34 is 50W. in FIG. 4, curves 36, 38, 40, 42 and 46 are all the same viscosity but are manufactured by different manufacturers. Again, all curves converge in the 70° C. range.

Figure 5:
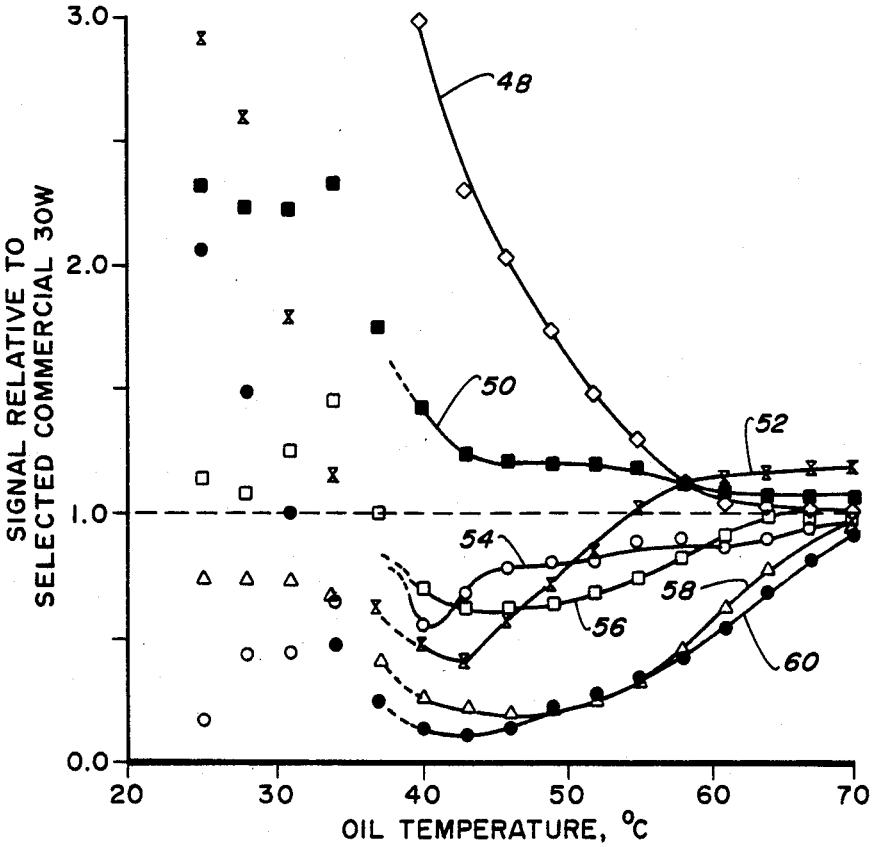
FIG. 5 is a graph showing ratios of emission intensities given by various oils to the intensity measured for Pennzoil 30W motor oil at the same temperature.

The curves shown in FIG. 5 are plots of ratios of emission intensities given by various commercially available oils to the intensity measured for Pennzoil 30W at the same temperature. Curves 48, 50, 52, 56, 58 and 60, each of which is a different brand of lubricating oil, all converge at the 70° C. temperature.

The invention thus described makes it possible for undiluted oil samples to be nebulized into an inductively coupled plasma with a minimal effect of viscosity upon nebulization efficiency.

Obviously many modifications and variations of the present invention are possible in the light of the above teachings. It is therefore to be understood that within the scope of the appended claims the invention may be practiced otherwise than as specifically described.

What is claimed is:

1. An oil nebulizer for nebulizing particulate laden samples of used lubricating oils of varying viscosity to provide uniform aerosols which are suitable for introduction into an inductively coupled plasma atomic emission spectrophotometer comprising:

a. a chamber having a first inlet means for receiving particulate laden used lubricating oils at a predetermined flow rate;

b. said chamber having a second inlet means for receiving gas at a predetermined flow rate and at a predetermined pressure;

c. said second inlet means being an enclosed hollow channel having means at one end for receiving said gas, the opposite end of said hollow channel having a restricted orifice opening through said opposite end in axial alignment with said hollow channel and a grove in alignment with said first inlet means intersecting said orifice; and d. said first and second inlet means being positioned substantially at right angles to each other and said second inlet means being positioned substantially a forty-five degree angle to the horizontal so that oil from said first means will enter said vertical groove and flow in front of said orifice opening.

2. The oil nebulizer of claim 1 further comprising:

a. first and second heater means for heating said lubricating oils and said gas, respectively, to a temperature of approximately 70° C. prior to the interaction of said gas and said oils.

3. An oil nebulizer for nebulizing particulate laden samples of used lubricating oils of varying viscosity to provide uniform aerosols which are suitable for introduction into an inductively coupled plasma atomic emission spectrophotometer comprising:

a. A chamber having a first inlet means for receiving particulate laden used lubricating oils at a predetermined flow rate;

b. said chamber having a second inlet means for receiving gas at a predetermined flow rate and at a predetermined pressure;

c. said second inlet means being an enclosed hollow channel having means at one end for receiving said gas, the opposite end of said hollow channel having a restricted orifice opening through said opposite end in axial alignment with said hollow channel and a groove intersecting said orifice, a horizontal groove of sufficient length to receive oil from said first inlet means on the outer surface and in substantial parallel alignment of said channel intersecting said vertical groove; and d. said first and second inlet means being positioned substantially at right angles to each other and said second inlet means being substantially parallel to the horizontal so that oil from said first means will enter said horizontal groove and flow down said vertical groove in front of said orifice opening.

4. The oil nebulizer of claim 3 further comprising:

a. first and second heater means for heating said lubricating oils and said gas, respectively, to a temperature of approximately 70° C. prior to the interaction of said gas and said oils.

* * * * *